United States Patent

Mottier

[15] 3,668,530
[45] June 6, 1972

[54] APPARATUS FOR ELECTRONICALLY EVALUATING SIGNALS IN MUTUAL PHASE-QUADRATURE

[72] Inventor: François Mottier, Zurich, Switzerland

[73] Assignee: Aktiengesellschaft Brown, Boveri & Cie, Baden, Switzerland

[22] Filed: May 13, 1971

[21] Appl. No.: 143,028

[30] Foreign Application Priority Data

May 26, 1970 Switzerland ..........................7782/70

[52] U.S. Cl..............................328/147, 328/117, 328/149, 328/151, 307/235, 307/273
[51] Int. Cl........................................G06g 7/14, H03k 5/20
[58] Field of Search .........................328/146–151, 115–117; 307/235, 273

[56] References Cited

UNITED STATES PATENTS

| 3,502,992 | 3/1970 | Cooperman | 328/151 |
| 3,600,693 | 8/1970 | Vandenberg | 328/151 |

Primary Examiner—Donald D. Forrer
Assistant Examiner—David M. Carter
Attorney—Pierce, Scheffler & Parker

[57] ABSTRACT

Apparatus for electronically evaluating two output signals in mutual phase-quadrature from a measuring device in which the two phase-displaced signals are fed by way of parallel channels to the evaluating circuits and are represented respectively as the sine and cosine functions of which the argument is a measured variable proportional to the measured quantity. In order to establish an essentially error-free evaluation of the two signals so as to avoid errors which might be introduced as a result of variations of certain constants and differences in waveform of the signals, a regulator circuit provides for regulation of the d.c. component of one of the signals to a predeterminable voltage level, a comparator circuit continuously compares the instantaneous values of the regulated signal with that voltage level, a sensing and holding circuit is actuated at the moment when the instantaneous value of the first signal and the predeterminable voltage reach equality, the second signal is applied as an input to the sensing and holding circuit, the voltage value stored in the sensing and holding circuit is continuously compared with twice the value of the predeterminable voltage level, and an error signal proportional to any difference which may exist between these latter two compared values is utilized to regulate the second signal to this value.

6 Claims, 1 Drawing Figure

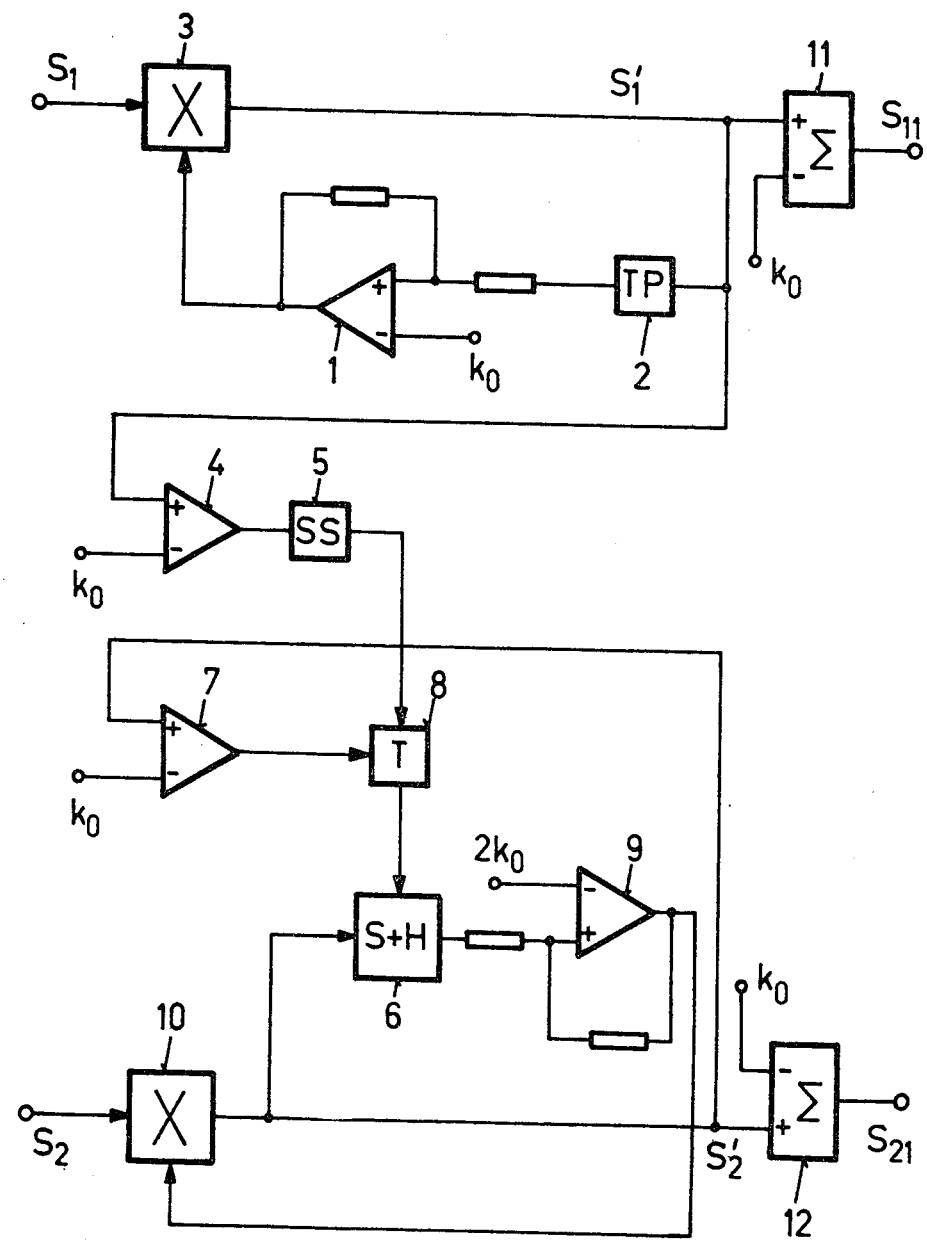

APPARATUS FOR ELECTRONICALLY EVALUATING SIGNALS IN MUTUAL PHASE-QUADRATURE

This invention relates to an apparatus for electronically evaluating signals in an opto-electronic measuring device, in which the evaluating circuits are fed by way of two parallel channels with electrical signals in mutual phase-quadrature, which signals can be respectively represented as sine and cosine functions of which the argument is the measured variable proportional to the measured quantity.

Opto-electronic measuring devices of the kind indicated above are known for example from Swiss Pat. specification No. 433,065 or German specification open to public inspection No. 1,918,730. In these known devices, a light beam is intensity-modulated in interferometric fashion by the magnetic field of an alternating current in a high-voltage conductor. Two electrical signals in mutual phase-quadrature are then derived from the light beams by means of photodiodes, which signals are fed into the two parallel channels of the evaluating circuitry and can be essentially described by the following equations:

$$S_1(t) = k_1 (1+\sin\phi(t)) \quad (1)$$
$$S_2(t) = k_2 (1+\cos\phi(t)) \quad (2)$$

In the above equations, $k_1$, $k_2$ are apparatus constants dependent on the intensity of the light source, on the symmetry of the transmission channels, on the sensitivity of the photodetectors, etc., and $\phi(t)$ is the measured variable to be obtained by evaluation and proportional to the measured quantity. To a first approximation constants for a phase-quadrature error, zero-drift and the like may be neglected. Equations (1) and (2) apply more particularly with good approximation to signals from silicon photodiodes, which exhibit a negligible dark current. In the known devices, the phase-displaced signals defined by equations (1) and (2) are then converted in the evaluating circuitry by modulation upon a carrier frequency and addition into a phase-modulated sinusoidal signal from which the measured variable can be obtained by frequency demodulation.

In co-pending patent application, Ser. No. 108,078 the signals in phase-quadrature are continuously compared with a sinusoidal voltage, and pulses proportional to the time intervals between two successive instants of equal amplitude are derived. For example, it is known from IEEE J. Quant. El.QE-2 No. 8 (1966), see page 255, to generate signals of the described fashion, but with a phase shift $\pi$, by polarization modulation instead of interferometrically. For this purpose the inclination of the plane of polarized laser light beam is varied with respect to a datum in proportion to the measured quantity by means of a magneto-optical crystal in an electro-optical measuring apparatus, and the light beam then is split up in a modified Glan-Thomson prism into two component beams with directions of oscillation inclined at $\pi/2$ with respect to one another, with the result that after the light intensities have been converted into electric currents, signals of the basic form defined by equations (1) and (2), but with a phase shift of $\pi$, are obtained. According to copending British Pat. application No. 60,653/70 this known process is modified in such a manner that the directions of oscillation of the two component beams of light are inclined at $\pi/4$ with respect to one another, with the result that electrical signals which also correspond to equations (1) and (2) as regards mutual phase shift are then produced.

If the measured variable $\phi(t)$ is an alternating quantity with a negligible d.c. component, which can be attained by suitable adjustment when measuring alternating currents in conductors, the d.c. component of the signal $S_1$ (Eqn. (1)) is proportional to the quantity $k_1$. On the contrary, the signal $S_2$ (Eqn. (2)) exhibits, in addition to a d.c. component proportional to $k_2$, a d.c. component which varies with the amplitude $\phi$ of the measured variable or the measured quantity. Furthermore, the signals also have different waveforms.

For these reasons, it has hitherto been difficult to compensate for fluctuations in signal amplitudes resulting from fluctuations in the values $K_1$, $k_2$.

In addition, no solution has hitherto been proposed to the problem of eliminating without any error the "1" term within the brackets in equations (1), (2), and this is likewise desirable in order to process the signals in the described circuits.

According to the present invention there is provided apparatus for electronically evaluating signals in mutual phase-quadrature, wherein the evaluating circuits are fed by way of two parallel channels with first and second electrical signals in mutual phase-quadrature, which signals can be respectively represented as a sine and a cosine function of which the argument is a measured variable proportional to the measured quantity, a regulator circuit whereby the d.c. component of said first signal is continuously regulated to a predeterminable voltage level, a comparator circuit wherein the instantaneous values of the regulated signal are continuously compared with said predeterminable voltage level, and a sensing and holding circuit which is arranged to be actuated at the moment when the instantaneous value of the signal is equal to the voltage level, means for applying said second signal to the input of said sensing and holding circuit, means for continuously comparing the voltage value stored at any particular time in the sensing and holding circuit with twice the value of the predeterminable voltage level and for applying the desired error signal proportional to any difference which may exist to regulate said second said signal to this value.

The invention stems primarily from the recognition of the fact that the d.c. component DC ($S_1$) of the signal $S_1$ is equal to $k_1$, regardless of the value of the measured variable $\phi(t)$. It is accordingly permissible for the value DC ($S_1$) = $k_1$ to be directly regulated by a conventional regulator circuit to a predeterminable level $k_o$ introduced from outside.

For the reasons hereinbefore explained, it is impossible for the value $k_2$ in the signal $S_2$ to undergo the required regulation in analogous fashion. Use is accordingly made of the further fact that when the measured variable $\phi(t)$ has a value of 0, the signal $S_2$ assumes the value $k_2$. The instant at which $\phi(t) = 0$ is determined by making use of the fact that the signal $S_1$, then has a value of $k_1$ or $k_o$. Sensing and storing of the value $S_2$ ($S_1 = k_o$) then makes it possible to generate from the difference $k_2 - k_o$, an error signal by means of which the signal $S_2$ can be so regulated by means of an adjusting element that $k_2$ also $=k_o$.

External introduction of the level $k_o$ enables the values $k_1$, $k_2$ to be externally regulated, with the result that the signals can be better matched to the following part of the evaluating circuitry. The "1" term may then be eliminated without error by simple subtraction of the level $k_o$ from the regulated signals $S'_1$, $S'_2$.

As may be seen from equations (1) and (2), $S_1(t) = k_1(=k_o)$ not only for $\phi = 0$, but also for integral positive or negative multiples of $\pi$. For odd multiples of $\pi$ however $S_2$ is not $2k_2$ but is zero. In order that this latter value shall not be stored by the sensing and holding circuit, the latter is advantageously made operative for amplitudes $/\hat{\phi}/ \geq \pi$ of the measured variable $\phi(t)$, only when the signal $S_2>0$. Since the level $k_o$ is always available it is expedient to test this condition by comparing the signal $S_2$ with this level $k_o$.

The regulating operations are conveniently carried out in the signal channels by using differential amplifiers with a high amplification factor as regulators, and multipliers or amplifiers with an adjustable amplification factor as adjusting elements in the signal channels.

Other known means for effecting the desired operations may however be used if preferred.

A voltage comparator which alters its output voltage very rapidly when $S_1$ becomes greater or less than $k_o$ is advantageously provided in the circuit for controlling the sensing and holding circuit. The change in voltage may then be used to activate a monostable trigger acting as a pulse shaper which turns on the sensing and holding circuit.

Blocking of the connection between the monostable trigger and the sensing and holding circuit may likewise be controlled by a comparator circuit by means of which a gate circuit or even an AND member is opened or closed.

The invention will be more precisely explained hereinafter with the aid of an exemplary embodiment illustrated in the accompanying drawing which shows a block circuit diagram of an apparatus according to the invention.

A signal $S_1$ in accordance with equation (1) enters a first channel of the circuit at $S_1$ and a signal $S_2$ in accordance with equation (2) enters the second channel of the circuit. Each channel includes an adjusting element in the form of a multiplier 3 or 10 which regulates the value of $k_1 = k_o$ or $k_2 = k_o$ respectively, resulting in the functions $$S'_1 = k_o (1 + \sin\phi) \quad (3)$$
$$S'_2 = k_o (1 + \cos\phi) \quad (4)$$

for the regulated signals.

The "1" is then eliminated by subtraction of $k_o$ in subtraction members 11 and 12, resulting in signals of the forms $$S_{11} = k_o \sin\phi \quad (5)$$
$$S_{12} = k_o \cos\phi \quad (6)$$

Such signals are suitable for error-free processing in a known system of evaluating electronics to be imagined following the circuit shown which is described at the beginning.

Regulation of the signal $S_1$ is controlled from a high-gain differential amplifier 1, to one input of which is fed the d.c. value of the signal $S'_1$, derived by means of a low-pass filter element 2, and to the other input of which is fed a signal representing the value $k_o$. The multiplier 3 is fed from the output of the differential amplifier 1 with a signal representing the factor $\alpha = k_o/k$, which regulates itself so that the difference at the inputs of the amplifier 1 becomes as small as possible.

Similar regulation is effected upon the signal $S_2$, the multiplier 10 being fed with a signal representing the factor $\beta = k_o/k$, which results from comparison in a high-gain differential amplifier 9 of signals representing the values $2 k_2$ and $2 k_o$.

The signal of value $2 k_2$ for the non-inverted input of the differential amplifier 9 is taken from a sensing and holding circuit 6 which is connected to the output of the multiplier 10, and is thus fed with the signal $S'_2$. The sensing and holding circuit 6 is controlled by a monostable trigger 5 which is arranged to be activated when $S'_1 = k_o$. For this purpose, a comparator 4 is fed with signals $S'_1$ and with a signal representing the value $k_o$ and, when these compared signals are equal yields an output signal which is applied to initiate trigger 5. A gate circuit 8 ensures that the connection between the sensing and holding circuit 6 and the trigger 5 is broken when $S'_2 < k_o$. This is done by comparing the signal $S'_2$ with the level $k_o$ in the comparator 7, the output voltage of which opens or closes the gate circuit 8.

I claim:

1. Apparatus for electronically evaluating signals in mutual phase-quadrature, wherein the evaluating circuits are fed by way of two parallel channels with first and second electrical signals in mutual phase-quadrature, which signals can be respectively represented as a sine and a cosine function of which the argument is a measured variable proportional to the measured quantity, a regulator circuit whereby the d.c. component of said first signal is continuously regulated to a predeterminable voltage level, a comparator circuit wherein the instantaneous values of the regulated signal are continuously compared with said predeterminable voltage level and a sensing and holding circuit which is arranged to be actuated at the moment when the instantaneous value of the signal is equal to the voltage level, means for applying said second signal to the input of said sensing and holding circuit, and means for continuously comparing the voltage value stored at any particular time in the sensing and holding circuit with twice the value of the predeterminable voltage level and for applying the desired error signal proportional to any difference which may exist to regulate said second said signal to this value.

2. Apparatus in accordance with claim 1 wherein the regulator circuit for the d.c. component of the first signal includes a regulator in the form of a differential amplifier, to one input of which the first signal is fed via a low-pass filter element, and to the other input of which the predeterminable voltage level is fed, and an adjusting element in the form of an amplifier in the channel of the first signal of which the gain is controlled by the output signal from said differential amplifier.

3. Apparatus in accordance with claim 1 wherein the sensing and holding circuit is arranged to be actuated only when said second signal is greater than zero.

4. Apparatus in accordance with claim 1 wherein the means for regulating said second signal includes a second differential amplifier whereof the output is connected to control the gain of an amplifier arranged in the channel of the second signal and whereof one input is fed with twice the value of the predeterminable voltage level, and the other input is connected to the output of the sensing and holding circuit whereof the signal input is connected to the channel of the second signal and whereof the control input is connected to the output of a monostable trigger fed from a first comparator of which one input is connected to the channel of the first signal and the other input is connected to the source of the predeterminable voltage level.

5. Apparatus in accordance with claim 4 and including a second comparator, to the first input of which the regulated second signal is applied, and to the second input of which the predeterminable voltage level is applied, and the output of which is connected to the control input of a gate circuit, the other input of which is connected to the output of the monostable trigger, the output of the gate circuit being applied to the control input of the sensing and holding circuit.

6. Apparatus in accordance with claim 4 wherein means are provided for subtracting the predeterminable voltage level from the regulated signals.

* * * * *